June 19, 1945.   J. W. YOUNG ET AL   2,378,613
FUEL TANK FLAPPER VALVE
Filed Dec. 1, 1941

JOHN W. YOUNG,
CHARLES E. PATTERSON,
INVENTORS

BY
ATTORNEYS

UNITED STATES PATENT OFFICE 2,378,613

FUEL TANK FLAPPER VALVE

John W. Young, Huntington Palisades, and Charles E. Patterson, Pacific Palisades, Calif., assignors to Arrowhead Rubber Company, Vernon, Calif., a corporation of California Application December 1, 1941, Serial No. 421,182

4 Claims. (Cl. 251—123)

Our invention relates to a new and useful improvement in fuel tank flapper valve.

An object of our invention is to provide an improved means of preventing backwash or the sudden shifting of weight in fuel or water tanks.

Most vehicles propelled by means of internal combustion engines or power units utilizing liquid fuel are provided with tanks for carrying such fuel. In order to prevent the rapid shifting of the bulk and weight of the fuel in the tanks due to gravity or centrifugal force baffle plates are provided in said tanks. Such a baffle plate consists of a relatively rigid partition or plate member installed vertically in the tank and securely fastened therein, dividing the tank into two or more compartments or sections. To allow the fuel to flow to a given point or outlet; maintain proper distribution of weight and a head of fuel over the tank outlet under all operating conditions, holes are provided in the baffle plates, closed by flapper valves acting under influence of gravity, or weight of the fuel.

Objects of our invention are to provide an improved form of flapper valve which will allow the fuel to flow in one direction through the hole in the baffle plate but not in the opposite direction.

A further object of our invention is to provide a valve of the character described which will be gravity actuated, has a readily flexible suspension element which will resist any tendency to sidesway, which is of light weight yet durable, is easily installed, and of resilient material which will seal in the presence of fuel without disintegrating.

For this purpose we have provided a flapper valve made of a relatively soft resilient substance which will seal the hole in the baffle plate by means of gravity or the weight of the fuel.

Other objects and advantages of our invention will become apparent from further consideration of the description and drawing.

The invention will now be explained by describing in detail a complete flapper valve installation, it being understood that various departures can be made from the particular details shown without departing from the invention.

Figure 1:
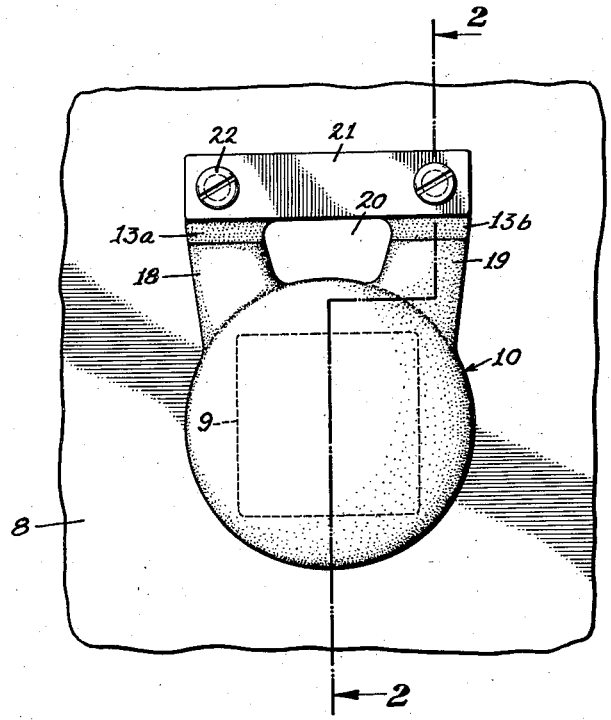
Figure 1 is a plan view of the valve installation.

A baffle plate 8 of any suitable design is formed with an opening 9. This opening 9 may be square as illustrated, or it may be round, rectangular, or otherwise, various shapes being known in the art. It is closed under certain operating conditions by our valve 10.

The valve 10 may be molded in one piece of any relatively soft resilient material which is resistant to gasoline, other fuel, or other liquid contained in the tank (not illustrated) of which the baffle 8 is a part. Rubber, Thiokol, "neoprene," fabric, and certain fibrous or plastic compositions, are examples of substances which may be used. They may be selected with reference to their availability and adaptability to resist any deteriorating action of the liquid to be contained in the tank wherein they are used, and the effect of temperature extremes.

The valve comprises a closure disc 11, an anchoring section 12 and an intermediate flexible web 13.

The closure disc is preferably concavo-convex, as at 14, and also thickened in the central region as at 15, and is formed with a marginal sealing face 16 which engages the surface of the baffle plate 8. The sealing face, at least, should be sufficiently soft and resilient to effect a liquid seal when urged against the baffle plate by the weight of fuel against the convex side 17, and under some operating conditions by the weight of the closure member itself. The concave form of the disc results in an improved seating of the sealing face 16 on the baffle plate. The thickened central region contributes firmness through that part of the disc where the closure disc itself has to withstand pressure.

The web 13 is preferably, though not necessarily, thinner than the closure disc, to impart greater flexibility where the hinging movement occurs. It is also preferably narrow but relatively wide, and is joined to the disc by connecting tabs 18 and 19. I prefer to make the web in two sections 13a and 13b with a space 20 therebetween to provide increased flexibility and decreased weight at this point.

Making the web 13 narrow as measured from the anchoring section 12 to the tabs 18 and 19, but relatively wide decreases any tendency of the disc to sidesway which might unseat it.

The anchoring secttion 12 preferably extends across the space 20 without any break, and may advantageously be reinforced by a metal strip 21, vulcanized to the section 12 if desired. Such a strip facilitates the use of mounting screws or bolts 22, by which the anchoring section is secured to the baffle plate.

While I prefer to mold the several parts 11, 12, 13, 18 and 19 as an integral unit, they may be made separately and of different materials and assembled in the relationship shown. Thus, for example, it might be feasible for certain purposes to form the disc 11 and tabs 18 and 19, and the section 12, of rubber, and the web 13 of fabric, vulcanizing, cementing, or otherwise suitably attaching the parts together.

If desired, some form of reinforcing material, such for example as a metal ring, might be embedded in the disc. Or the entire valve might be molded of rubber, or synthetic rubber, and so compounded and vulcanized that the disc is relatively hard and rigid except the sealing face 16 which could be relatively soft and the web 13 which also could be relatively soft. If the anchoring section 12 is made sufficiently firm, the metal strip 21 may be omitted, or separate washers substituted for it.

Figure 2:
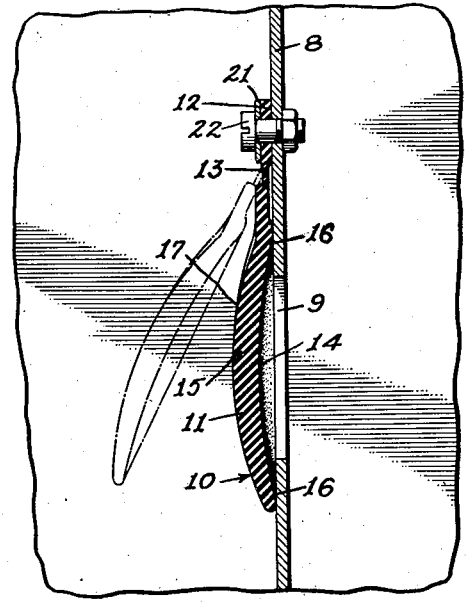
Figure 2 is a sectional view of the same taken on the line 2—2 of Figure 1.

In use, assuming the baffle 8 is in a vertical position as illustrated in Figure 2 and the fuel level is equalized, or the baffle is leaning to the right, the pressure of fuel on the left hand side of the baffle plate will close the valve. In doing so, the convex face is tended to be flattened, improving the sealing effect of the sealing surface 16. Gasoline, or other liquid in the tank to the left of the baffle plate cannot then flow through the opening 9; and if the outlet is in the compartment to the left of the baffle plate, a head will be maintained therein. Moreover, any substantial shifting of weight will be prevented. A centrifugal thrust toward the right will be minimized in effect the same way.

If the baffle plate is leaning toward the left, or the thrust is toward the left, the valve will swing open, as shown in dotted lines (Figure 2), and liquid may flow through the opening 9 in a left hand direction.

If the liquid level to the left of baffle 8 is lower than the level to the right, the pressure will open the valve slightly to allow the liquid level to adjust itself.

Although we have herein shown and described our invention in what we have conceived to be the most practical and preferred embodiment, it is recognized that departures may be made therefrom within the scope of our invention, which is not to be limited to the details disclosed herein but is to be accorded the full scope of the claims so as to embrace any and all equivalent structures.

The essence of our invention resides in a flapper valve adapted to be mounted on a wall or baffle, and comprising a closure disc or member formed with a sealing surface adapted to engage the surface of the baffle or a valve seat thereon surrounding the opening in the baffle, and suspended by a web of sufficient flexibility to permit the ready swinging of the valve closure member but sufficiently firm to prevent side motion to the extent of unseating the closure.

Having described our invention, what we conceive to be new and desire to secure by Letters Patent is:

1. A flapper valve for a baffle having an opening therein comprising: a closure member of relatively thick homogeneous material having sufficient rigidity to prevent collapse under operating pressure but a resilient surface for making sealing contact against said baffle and sufficient inherent weight to cause said closure member to seal against said baffle by gravity when said closure member is overlying said baffle in a position offset from the vertical, said member being formed with straight tabs extending upwardly therefrom and substantially unflexible in the plane of said closure member, an anchoring section for attachment to said baffle, and web portions hingedly connecting the outer ends of said tabs and said anchoring section and being flexible for bending only along a narrow straight portion adjacent to said anchoring section and parallel to a tangent of said closure member.

2. A one-piece flapper valve for a baffle in subdivided liquid tanks having an opening therein comprising: a concavo-convex closure member of relatively thick homogeneous material thicker in the central region than around the margin and having sufficient rigidity to prevent collapse under operating pressure but of sufficient resiliency to provide a surface on the concave side for making sealing contact against said baffle and sufficient inherent weight to cause said closure member to seal against said baffle by gravity when said closure member is overlying said opening in a position offset from the vertical, an anchoring section on said closure member for attachment to said baffle approximately as long as the diameter of the closure member, and flexible web hinge connection means between said closure member and said anchoring section, said hinge connection means being constructed and arranged to provide more flexibility than any part of the closure member or the anchoring section but having opposite outside points of connection to the closure member and anchoring section respectively spaced approximately as far apart as the diameter of the closure member to prevent relative lateral movement of said closure member and anchoring section.

3. A flapper valve for a baffle having an opening therein comprising: a closure plate having a yielding, soft sealing surface adapted to lie against said baffle over said opening, an anchoring member having a straight edge spaced from the closure plate and adapted to be secured to the baffle, connecting means formed integral with the closure plate and anchoring member for swingably suspending the closure plate, said connecting means being reduced in thickness at a point between the closure plate and anchor member to provide greater flexibility than the remainder of the connecting means and extending parallel to the said straight edge of the anchoring member but being constructed and arranged to prevent lateral movement, whereby the closure plate may swing freely to open and close but will not sidesway.

4. A flapper valve for a baffle having an opening therein comprising: a closure plate having a yielding, soft sealing surface adapted to lie against said baffle over said opening, an anchoring member having a straight edge spaced from the closure plate and adapted to be secured to the baffle, connecting means formed integral with the closure plate and anchoring member for swingably suspending the closure plate, said connecting means being reduced in thickness at a point immediately adjacent the anchoring means to provide greater flexibility than the remainder of the connecting means and extending parallel to the said straight edge of the anchoring member but being constructed and arranged to prevent lateral movement, whereby the closure plate may swing freely to open and close but will not sidesway.

JOHN W. YOUNG.
CHARLES E. PATTERSON.